Patented Aug. 7, 1923.

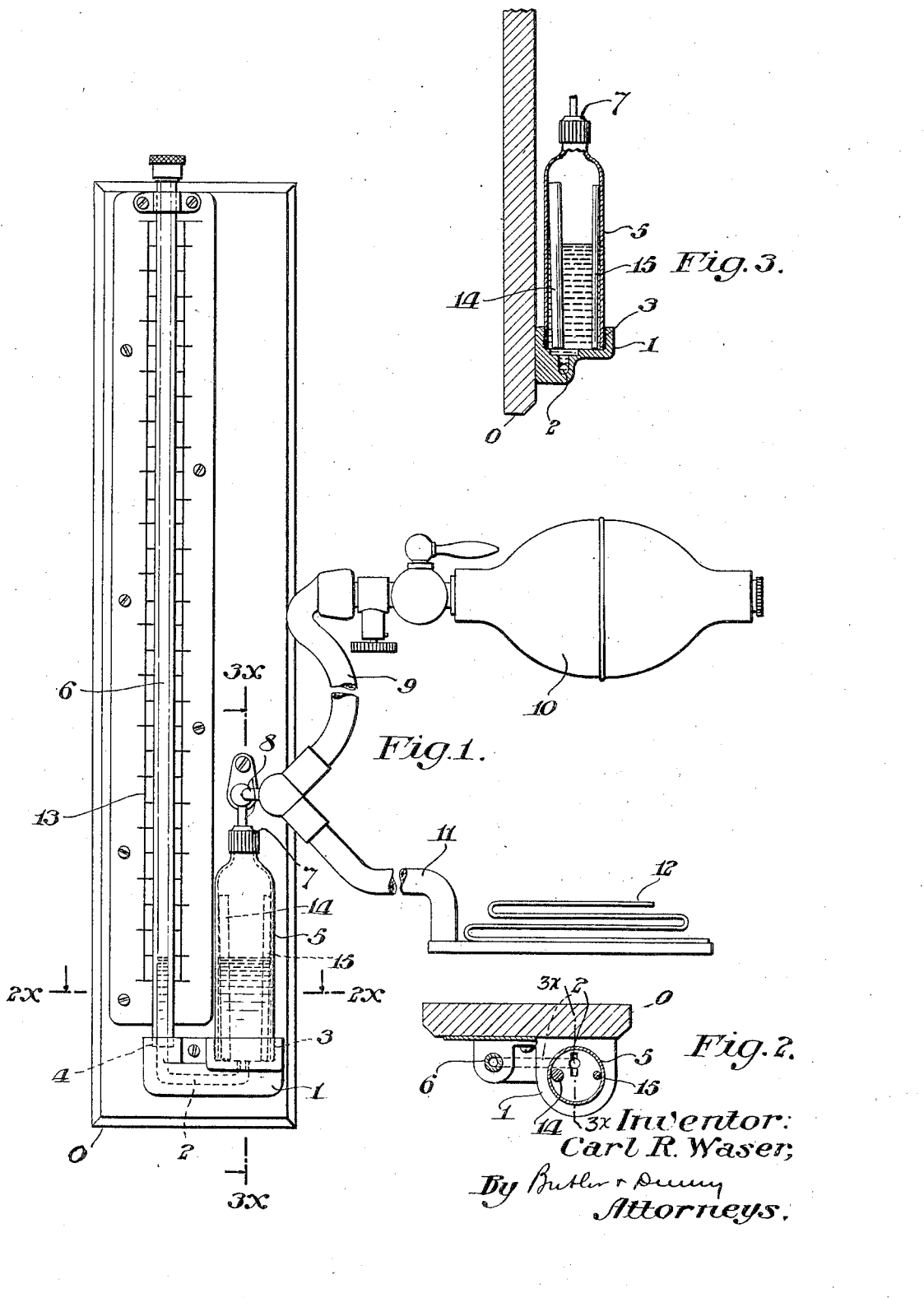

1,464,254

UNITED STATES PATENT OFFICE.

CARL R. WASER, OF PHILADELPHIA, PENNSYLVANIA, ASSIGNOR TO PRECISION THERMOMETER & INSTRUMENT COMPANY, OF PHILADELPHIA, PENNSYLVANIA, A CORPORATION OF PENNSYLVANIA.

METHOD AND APPARATUS FOR COORDINATING THE PRESSURE COLUMNS OF LIQUID-PRESSURE GAUGES.

Application filed January 11, 1922. Serial No. 528,362.

*To all whom it may concern:*

Be it known that I, CARL R. WASER, a citizen of the United States, residing in the city of Philadelphia, county of Philadelphia, and State of Pennsylvania, have invented a new Method and Apparatus for Coordinating the Pressure Columns of Liquid-Pressure Gauges, of which the following is a specification.

In the construction of liquid pressure gauges, the bores of the glass tubes, used for holding the liquid columns corresponding to the pressures to be measured, vary in cross section from the given diameters, due to imperfections in manufacturing processes, it being difficult or impossible to obtain tubes of correct bores which has necessitated the expense of making a special scale for each instrument to conform with its particular characteristics.

It is the primary object of my invention to provide instruments in which standard scales can be used and correct readings obtained. This object is attained by coordinating the connected interior cross sections or bores of the liquid reservoir and measuring tube so that the measuring or indicating column will rise under the various pressures according to a uniformly graduated standard scale.

In the preferred practice of my invention, as applied to liquid pressure gauges such as sphygmomanometers, I provide a reservoir or cistern adapted for holding a supply of liquid that will maintain a constant surface area at different levels assumed under different pressures and a tube connected therewith to hold a liquid column which varies in height with said pressures, and I adjust the cross sectional area of the reservoir by placing a small rod or rods of uniform cross section therein that will reduce the cross section of the liquid in the reservoir to the correct ratio to the cross section of the tube, so that the liquid will rise therein under any given pressure in accordance with the graduation of the standard scale, the reservoir being made for use with tubes that have the maximum oversize bore.

The improvements, therefore, provide for the simple adjustment of the liquid column to the scale rather than a difficult and expensive adjustment of the scale to the liquid column.

In the accompanying drawings, Fig. 1 is a broken elevation of a liquid pressure gauge of the sphygmomanometer type adapted for illustrating the invention; Fig. 2 is a sectional view of the same taken on the line 2×—2× of Fig. 1, and Fig. 3 is a sectional view taken on the line 3×—3× of Fig. 2.

The pressure gauge illustrated in the drawings comprises a base 1 containing a conduit 2 terminating in the bottoms of the sockets 3 and 4 formed in the top of the base.

A cistern or reservoir 5, preferably providing a chamber of cylindrical form, or such that the liquid required therein shall have a constant surface area at its different elevations, is set in the socket 3, and a glass tube 6 is set in the socket 4, the bottom of the cistern and the bottom of the tube being connected through the conduit 2 with the provision of an instrument having the U-tube characteristics.

The top of the cistern is closed by a cap 7 and communicates therethrough with a conduit 8 which is connected by a tube 9 with a pressure bulb 10 and by a tube 11 with a pneumatic band 12.

The connected parts 1, 5, 6 and 8 together with a standard scale 13 are mounted on a base 0 in such relation that the datum, base or zero point on the scale shall be in the same horizontal plane as the surfaces of the liquid in the cistern and tube at atmospheric pressure, with the instrument in the vertical position.

The drawn glass tubes of commerce from which the tube 6 is made are found to vary substantially from the intended or designated bore, so that if it is desired to have the bore say $\frac{1}{4}$th of an inch in diameter the tube provided may have a diameter of $\frac{3}{16}$th of an inch. Hence is is manifested that the column of liquid as mercury in the tube of $\frac{3}{16}$th inch bore will not have the same height as the column of liquid in the tube of $\frac{1}{4}$th inch bore for any given pressure used in operating the gauge. Consequently the same scale will not answer for both tubes or tubes of different bores, if the liquid is supplied from a column of fixed cross sectional area.

If, however, the cistern 5 be designed to hold a column of liquid of uniform cross section, coordinated to the maximum cross sectional area of the tube 6, designed to have a given bore but departing therefrom, a scale that will not interpolate the pressures accurately from the levels of the column in this tube 6 of maximum bore, can be made to interpolate them accurately by reducing the cross sectional area of the liquid in the reservoir 5.

In accordance with my invention, this cross sectional area of the liquid in the reservoir 5 is reduced to the required amount by placing therein a cylindrical rod 14 or 15 of different diameters, or both, the cross section of the liquid in the reservoir being thus adjusted to the proper relation to the cross section of the liquid in the tube, the amount and level of the liquid being adjusted so that at atmospheric pressure it will stand at the zero or datum point of the scale 13. As now the cross sectional area of the liquid in the reservoir 5 and in the tube 6 are in the proportion that is required for effecting the movement of the indicating column of liquid for which the scale 13 is designed, the pressures can thus be indicated accurately upon a standard scale.

Having described my invention, I claim:

A sphygmomanometer having a pressure reservoir adapted for holding a column of liquid with a constant surface area at different levels, a pneumatic pump and band connected with the upper part of said reservoir, a glass reading tube having its axis parallel with the axis of said reservoir and its bottom connected with the bottom of said reservoir, a graduated scale parallel with the axis of and adjacent to said tube and having a datum point in the same horizontal plane as the surfaces of the liquid in the cistern and tube at atmospheric pressure, with the instrument in the vertical position, and a displacement device having a constant cross sectional area throughout the range of movement of said liquid therealong affecting the proportionate relation between the cross sectional areas of the liquid columns in the reservoir and the tube that will regulate the movement of the liquid in the tube under pressure in the reservoir in correspondence with the graduations of the scale.

In testimony whereof I have hereunto set my name this sixth day of January, 1922.

CARL R. WASER.